June 23, 1942. J. P. SPANG 2,287,278
MEAT SLITTING MACHINE
Filed May 9, 1939 7 Sheets-Sheet 4
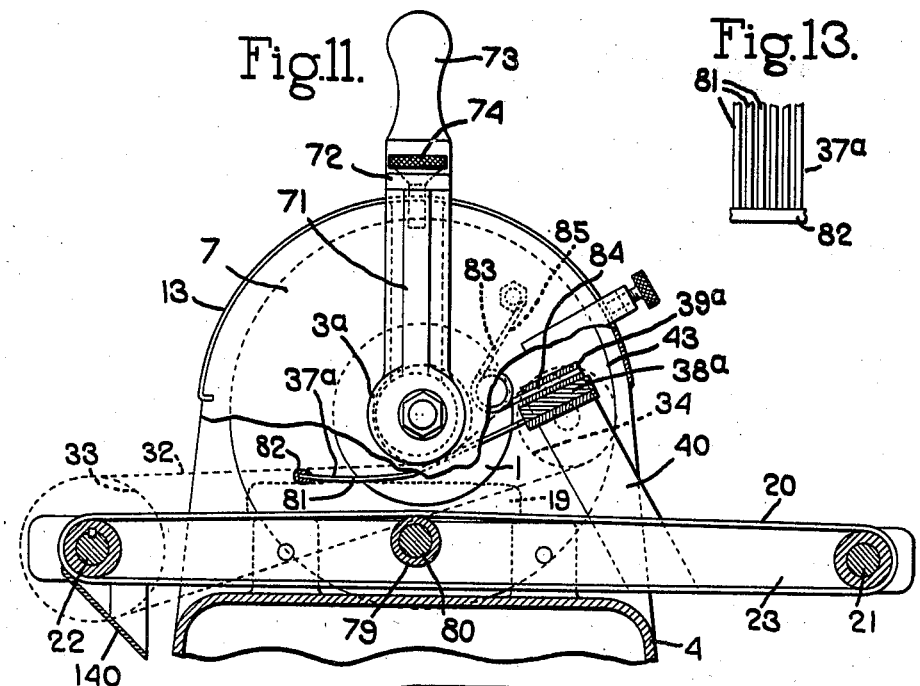
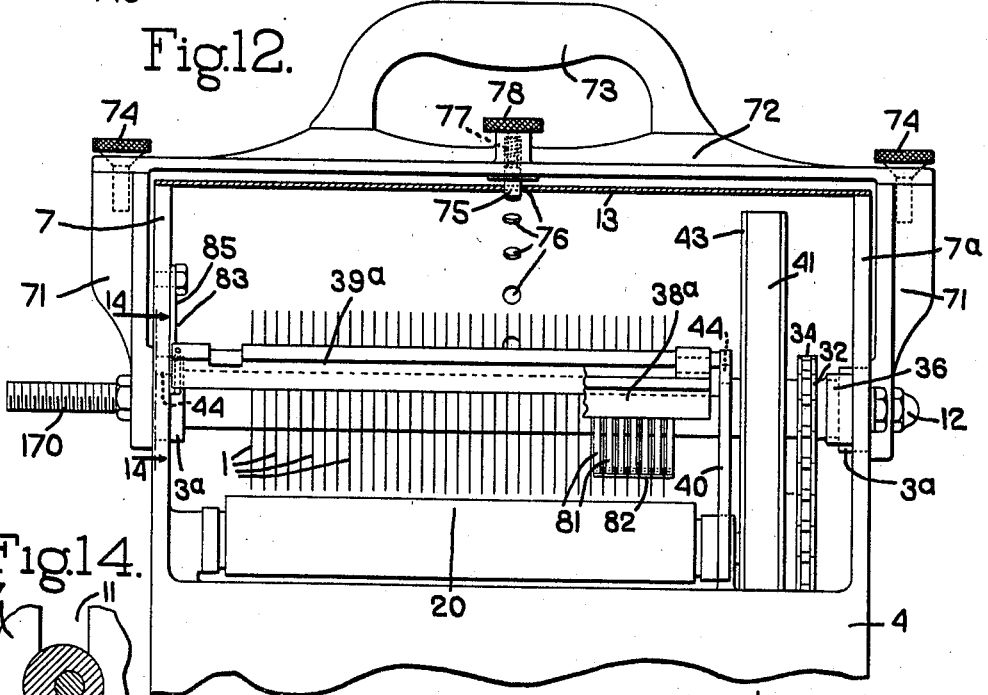
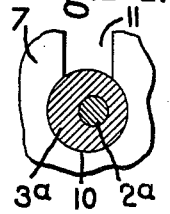
Inventor.
Joseph P. Spang
by Heard Smith & Tennant.
Attys.

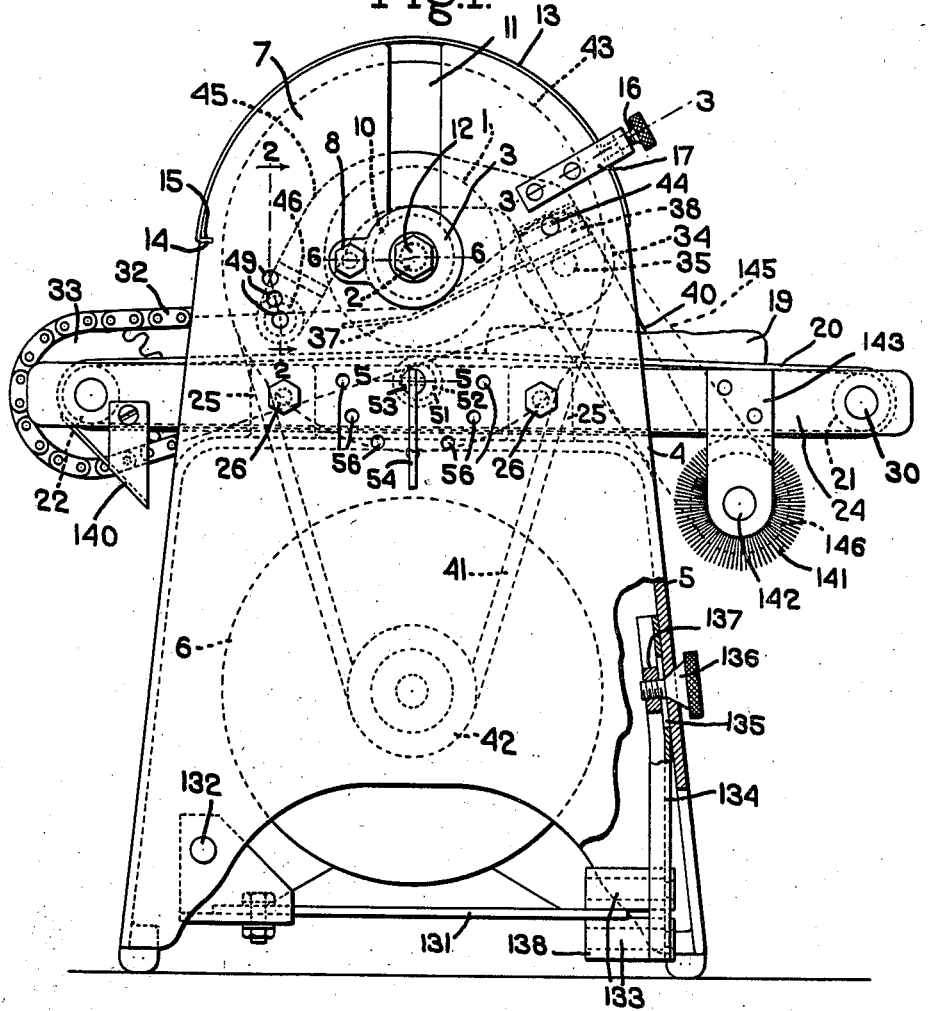

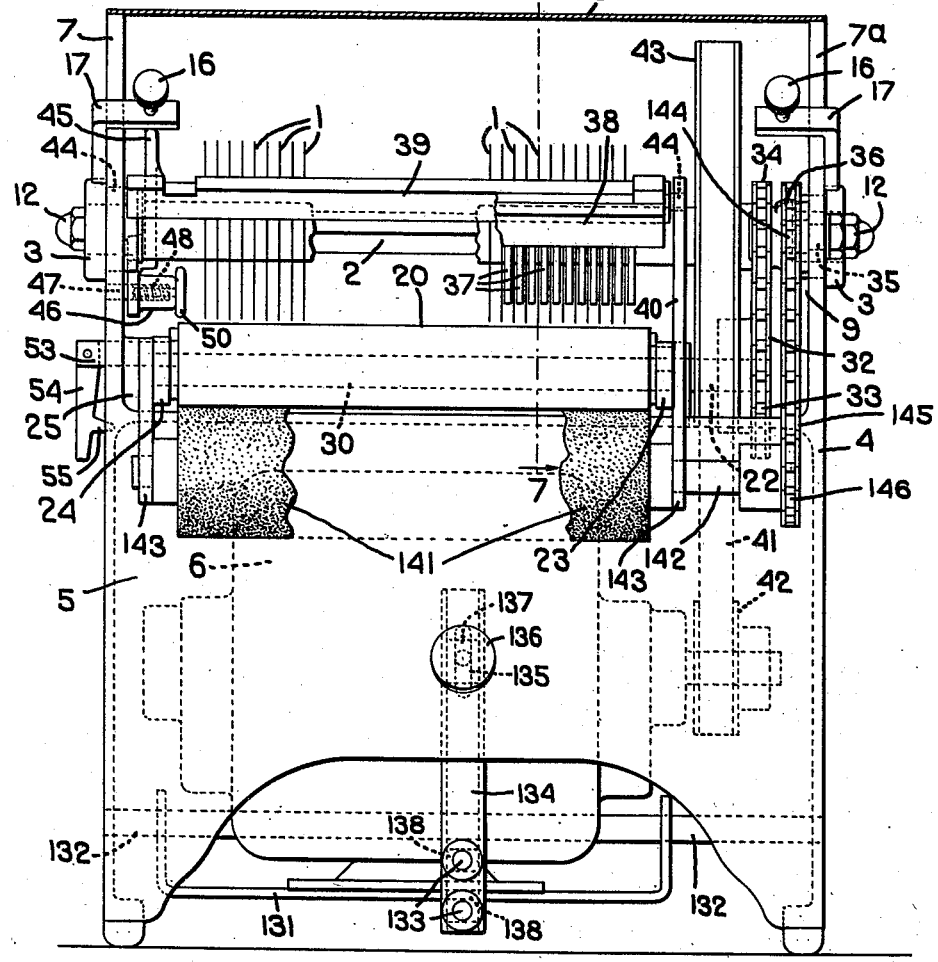

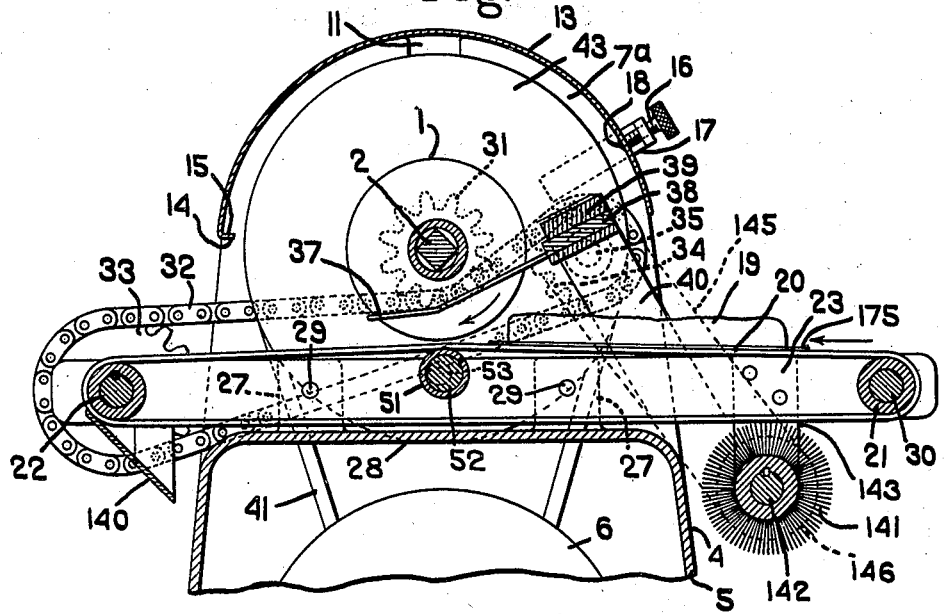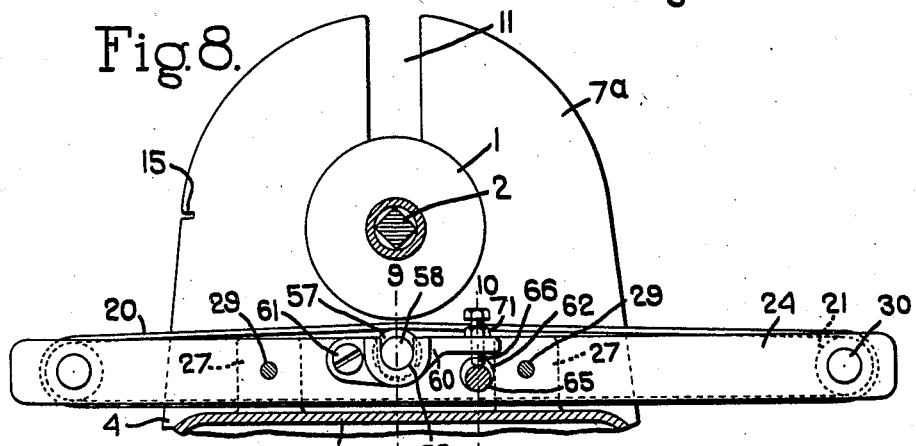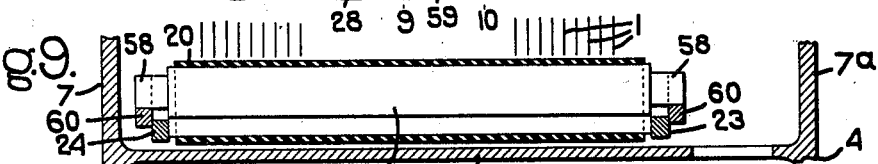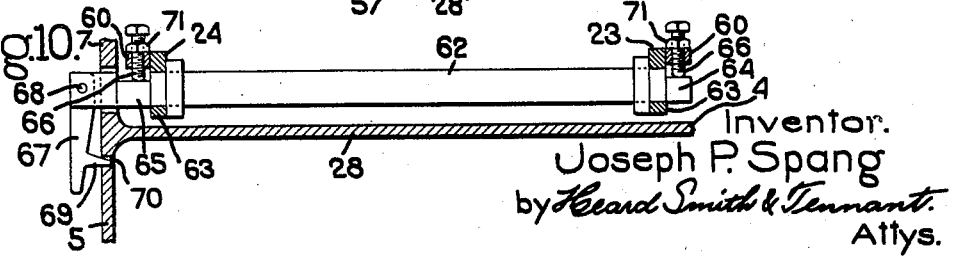

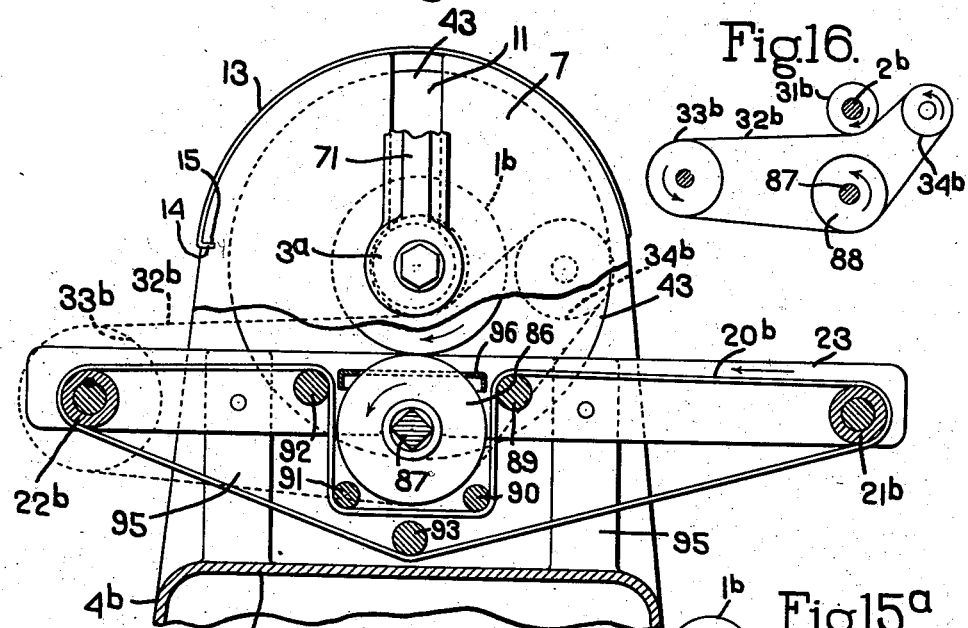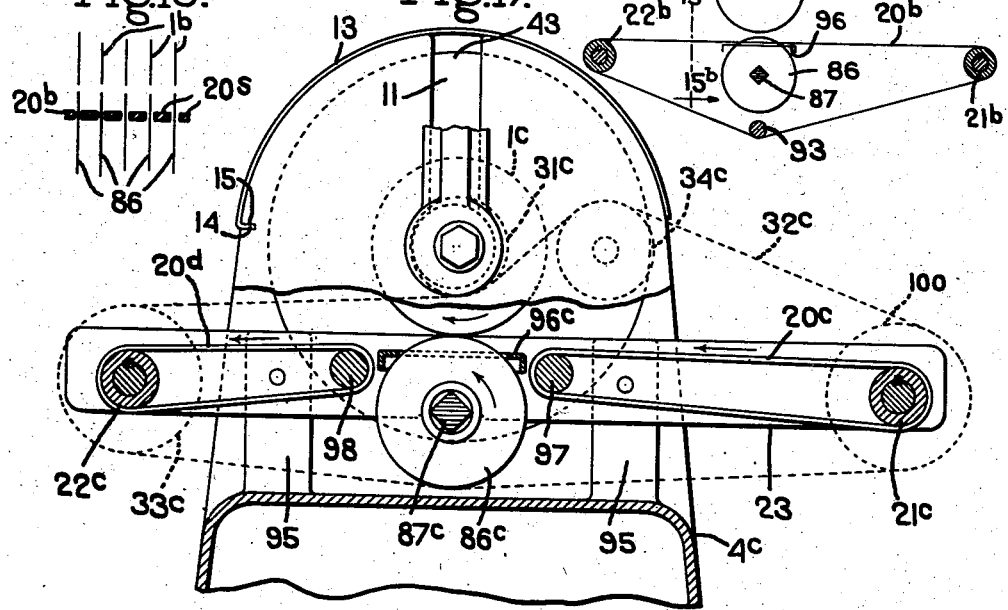

June 23, 1942.	J. P. SPANG	2,287,278
MEAT SLITTING MACHINE
Filed May 9, 1939	7 Sheets-Sheet 6
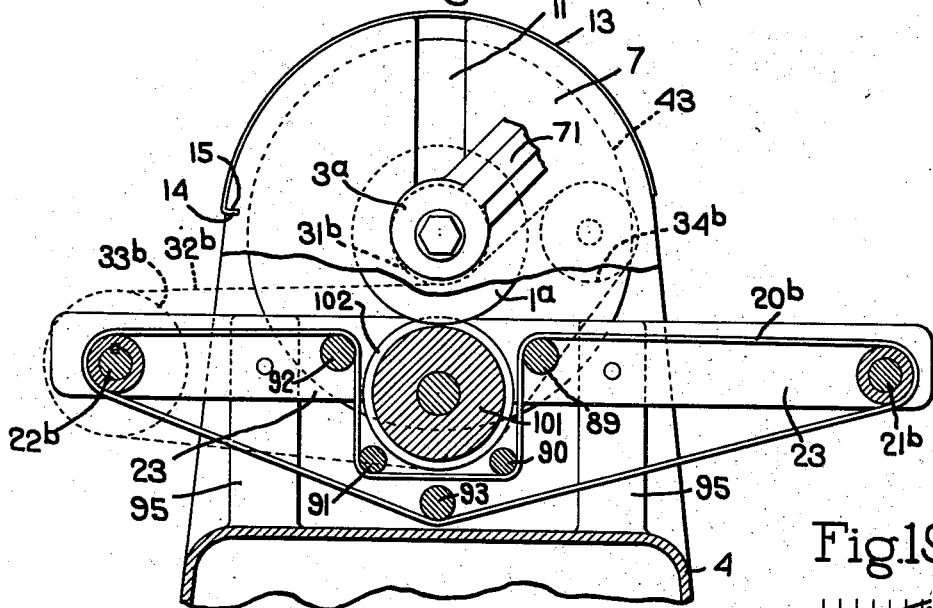
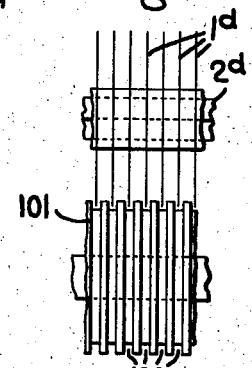
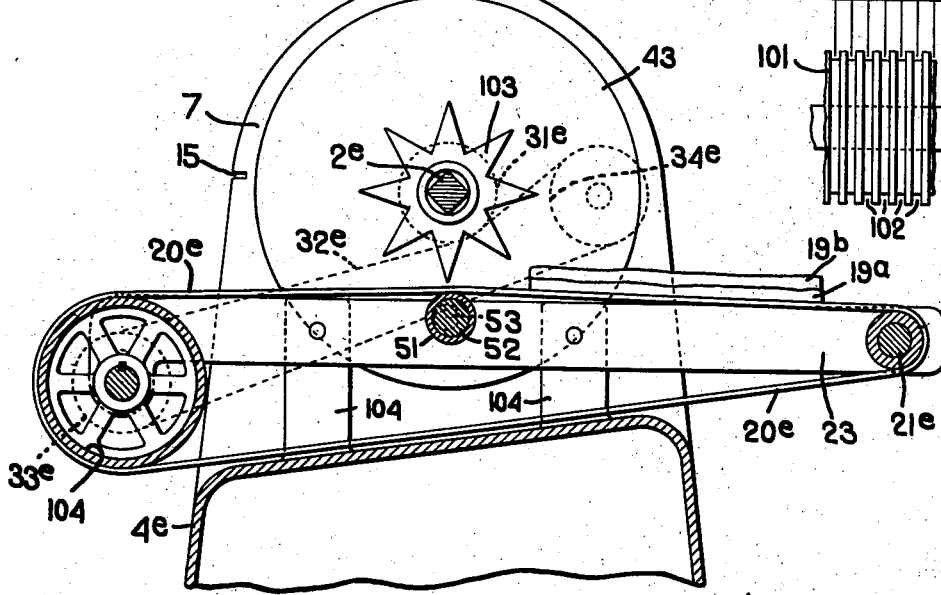
Inventor.
Joseph P. Spang
by Heard Smith & Tennant.
Attys.

Inventor.
Joseph P. Spang
by Heard Smith & Tennant.
Attys.

Patented June 23, 1942

2,287,278

UNITED STATES PATENT OFFICE 2,287,278

MEAT SLITTING MACHINE

Joseph P. Spang, Quincy, Mass., assignor to Cube Steak Machine Company, Inc., Boston, Mass., a corporation of Massachusetts Application May 9, 1939, Serial No. 272,602

5 Claims. (Cl. 17—25)

This invention relates to meat slitting machines of the type having a plurality of rotary slitting knives for slitting the meat and an endless apron for feeding the meat to and past the slitting knives.

The features wherein the invention resides will be more fully set forth and then pointed out in the appending claims.

In the drawings:

Fig. 1 is a side view with part broken out illustrating a meat slitting machine embodying my invention;

Fig. 2 is a section on the line 2—2, Fig. 1;

Fig. 3 is a section on the line 3—3, Fig. 1;

Fig. 4 is an end view of the machine shown in Fig. 2;

Fig. 5 is a section on the line 5—5, Fig. 1;

Fig. 6 is a section on the line 6—6, Fig. 1;

Fig. 7 is a section on the line 7—7, Fig 4;

Fig. 8 is a fragmentary sectional view showing a different embodiment of the invention;

Fig. 9 is a section on the line 9—9, Fig. 8;

Fig. 10 is a section on the line 10—10, Fig. 8;

Fig. 11 is a view similar to Fig. 7 but showing still another embodiment of the invention;

Fig. 12 is an end view of the structure shown in Fig. 11;

Fig. 13 is a fragmentary view showing the stripper used in Fig. 11;

Fig. 14 is a section on the line 14—14, Fig. 12;

Fig. 15 is a part sectional view showing still a different embodiment of the invention;

Fig. 15a is a somewhat diagrammatic view showing a different embodiment of the invention;

Fig. 15b is a sectional view on the line 15b—15b, Fig. 15a;

Fig. 16 is a diagrammatic view illustrating the means for rotating the knives shown in Fig. 15;

Fig. 17 is also a part sectional view showing another embodiment of the invention;

Fig. 18 is a fragmentary sectional view showing an embodiment of the invention in which the rotary knives cut clear through the slice of meat, thereby to cut it into strips;

Fig. 19 is a fragmentary view illustrating the knives and grooved feed roll of Fig. 18;

Fig. 20 is a fragmentary view illustrating a device embodying the invention which is adapted to knit together two thin slices of meat.

Figure 21:
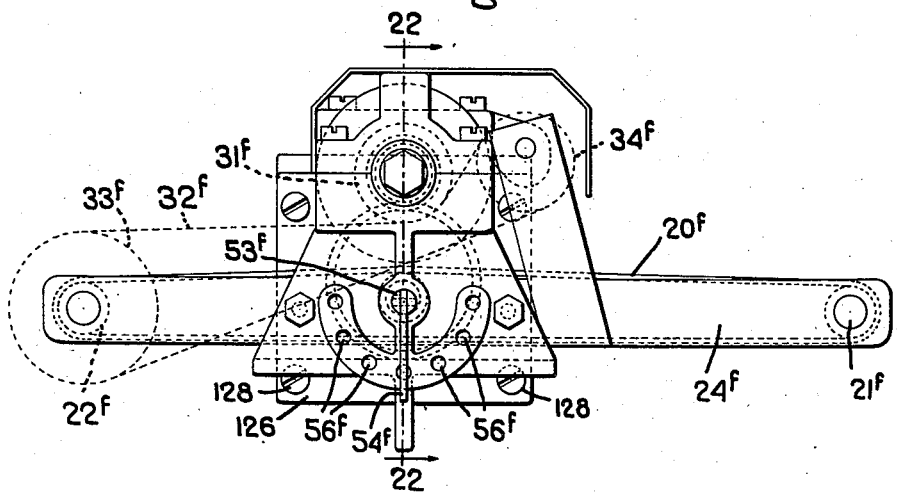
Fig. 21 is a side view of a meat slitting attachment embodying the invention adapted to be attached to a meat grinder or meat chopper or other kitchen implement.

Referring first to Figs. 1 to 7 of the drawings, 1 indicates the rotary disk slitting knives by which the meat is slit, said knives being mounted fixedly on a knife shaft 2 in any usual way, which shaft is journaled in suitable bearings 3 carried by the supporting frame 4. This frame 4 is formed with the hollow base portion 5 which is adapted to receive the motor 6 for rotating the knives and is also provided with two uprights or standards 7 and 7a which rise from the hollow base 5 and in which the bearings 3 for the knife shaft are mounted. The knife shaft is driven from the motor 6 by a belt 41 which passes around a pulley 42 on the motor shaft and around a pulley 43 fast on the knife shaft.

In Figs. 1 to 7, the bearings 3 are shown as mounted on the outside of the uprights 7 and 7a and are secured to the uprights by suitable clamping screws or bolts 8. The bearing members 3 are formed with hub portions 9 which extend through openings 10 in the uprights 7, 7a. The knife shaft 2 carries at each end a bearing bushing 12a which is retained on the shaft by a cap nut 12, said bushings 12a finding a bearing in the bearing members 3.

13 indicates a cover plate or hood which is supported on the uprights 7, 7a, and which covers and protects the knives 1. This hood is provided at one edge with a lip 14 which fits into a notch 15 with which the uprights 7, 7a are provided, and the cover is retained in place by retaining screws 16 which are carried by the horizontal portions of the brackets 17 that are secured to the uprights 7, 7a, each screw being screw-threaded through its bracket and the end of the screw fitting in a recess 18 formed in the cover plate 13. There are two such clamping screws 16, one associated with each of the uprights 7, 7a, and these clamping screws together with the lip 14 serve to firmly but detachably retain the hood or cover 13 in place.

Said uprights are provided with slots 11 leading to said openings 10 and which provide means for removing the knife assembly from the machine when it is necessary to clean or repair it. To accomplish this, the retaining screws 8 are removed so as to allow the bearing members 3 to be withdrawn from the apertures 10. The knife assembly may then be removed through the slots 11, it being understood that the cover plate 13 will have first been removed from the frame.

As stated above, the machine of this invention is of that type in which the slice of meat to be slit, which is indicated at 19, is fed to and past the knives by means of an endless apron, the latter being shown at 20. This apron passes around guide rolls 21, 22, that are rotatably mounted in an apron support comprising two side bars 23, 24, that are fixedly secured to the frame. The side bar 24 is secured to lugs or bosses 25 formed on the inside of the upright 7 by means of clamping bolts 26 and the side bar 23 is secured to lugs 27 which rise from the top 28 of the base by means of clamping screws 29.

The roll 21 is shown as an idler and is in the form of a sleeve freely rotatable on a pin 30 extending between the two side rails 23, 24. The roll 22 is a driven roll and serves to give traveling movement to the apron 20. In the present embodiment of the invention, this driven roll 22 is driven from the knife shaft 2 for which purpose said knife shaft is provided with a sprocket wheel 31 that engages the upper run of a sprocket chain 32, the latter passing around a sprocket wheel 33 rigid with the roll 22. 34 indicates an idle sprocket wheel which is freely rotatable on a stud 35 that is carried by the upright 7a. The knives and the knife shaft rotate in the direction of the arrow, Fig. 7, and in order to give the upper or meat-supporting run of the apron a movement in the right direction, the upper run of the sprocket chain passes underneath the sprocket wheel 31, as best seen in Fig. 7.

The slice of meat 19 to be slit is placed on the feed apron 20 at the right hand side in Figs. 1 and 7, and the movement of the apron 20 carries the meat beneath the knives 1 which are rotating clockwise, Fig. 7.

The relation between the size of the sprocket wheels 31, 33 and that of the knives 1 is such that the peripheral speed of the knives is considerably faster than the surface speed of the apron 20, and hence the knives will operate on the meat with a draw cut.

37 indicates a stripper which rests on the upper face of the slice of meat while it is being slit and which not only prevents the meat from being lifted off from the apron by the action of the knives, but also applies sufficient pressure and consequently retarding force against the slice to prevent it from slipping forwardly on the apron while being acted on by the rapidly rotating knives, whereby the knives slit the meat with a draw cut. This stripper 37 may have any suitable or usual construction. As shown in Figs. 1 and 7, it comprises a series of individually flexible fingers extending between the knives and carried by a head 38 which is removably mounted on a supporting bar 39. The construction of this stripper and the manner of mounting it on the supporting bar 39 are similar to that shown in my copending application Serial No. 91,676 filed July 21, 1936, now Patent No. 2,216,216, dated October 1, 1940. The supporting bar is carried partly by the upright 7 and partly by a bracket arm 40 which is secured to and rises from the side rail 23. This supporting bar 39 is pivotally mounted so as to provide for raising and lowering the position of the stripper 37 to accommodate slices 19 of different thicknesses. This bar has at its ends trunnions 44, one of which is journaled in the upright 7 and the other of which is journaled in the bracket arm 40. The supporting member 39 has an arm 45 rigid therewith which extends over the knife shaft adjacent the upright 7 and by which the supporting bar with the stripper thereon can be turned, thereby to raise and lower the stripper fingers. The end of the arm 45 is provided with a boss 46 carrying a locking pin 47 which is acted on by a spring 48 and is adapted to engage in any one of a plurality of apertures 49 with which the upright 7 is provided. The locking pin 47 has the head 50 by which it can be withdrawn from the aperture 49 when it is desired to adjust the position of the stripper (see Figs. 1, 2 and 4.)

There is provided a support for the upper run of the apron 20 directly beneath the knives 1, which support prevents the portion of the apron on which the meat is supported while it is being slit from sagging. In the construction shown in Figs. 1 to 7, this support is an adjustable support so that it not only prevents the apron from sagging but also provides means for adjusting the apron toward and from the knives, thereby gauging the depth of the slits which the knives will make in the meat. The apron support shown in Figs. 1 to 7 comprises a sleeve 51 which is loosely mounted on a shaft 52 that extends between the two side rails 23, 24. This shaft 52 has reduced ends 53, one of which is journaled in the side rail 23 and the other of which is journaled in and extends through the upright 7. The main portion of the shaft between the trunnions 53 is eccentric to the trunnions as shown in Figs. 1 to 7, so that by turning the shaft about its trunnions, the eccentric portion will raise or lower the apron. One of the trunnions has a handle 54 pivoted thereto by which it may be turned and this handle is formed with a projection or toe 55 that is adapted to engage in any one of a plurality of recesses 56 formed in the upright 7. This handle 54 thus provides means for operating the shaft 52 thereby to raise and lower the apron, and the nose 55 and apertures 56 provide means for locking the shaft in any adjusted position.

In Figs. 8, 9 and 10, I have shown an alternative method of adjusting the apron 20 toward and from the knives to vary the depth of the slits which the knives make in the steak. In this embodiment, the support for the apron comprises an idle roll 57, the ends 58 of which are rotatably mounted in open bearings 59 formed in arms 60 which are pivoted to the side rails 23, 24, as shown at 61.

Means are provided for adjusting the arms 60 about their pivots 61 thereby to raise or lower the supporting roll 57. For this purpose, I have provided a shaft 62 which is journaled in the two side rails, as shown at 63. The shaft projects beyond the two side rails 23, 24, and the projecting portions 64, 65 of said shaft are made eccentric. Each lever 60 carries at its end an adjusting screw 66, said adjusting screws resting on the eccentric portions 64, 65 of the shaft 62. The shaft 62 projects through the upright 7 of the frame and has a handle 67 pivoted thereto at 68, this handle being provided with a nose 69 adapted to enter one of a number of apertures 70 in the frame thereby to lock the lever and the shaft in adjusted position.

When the shaft 62 is turned by the handle 67, the action of the eccentric portions 64, 65, on the adjusting screws 66 serves to raise the levers 60 and thus raise the supporting roll 57.

The adjusting screws 66 provide for a fine adjustment of the supporting roll 57 and the levers 60 provide for a quick adjustment of greater amount than that provided by the screws.

I propose to make the apron 20 of some suitable material to which the slice 19 of meat will adhere sufficiently so that the action of the rapidly rotating knives on the meat will not slide the meat forward on the apron. I find that an apron of rubber which is soft, yieldable and more or less elastic will fulfill these requirements. The apron of elastic material has the further advantage that the elastic qualities thereof assist in delivering the slice of meat from the knives in a compact condition. When the leading end of the slice of meat engages the knives, the rapid rotation of the knives applies a pulling force to the meat tending to pull it along over the surface of the apron. As stated above, however, the adhesion of the meat with the apron is sufficient to prevent this, so that the slice of meat will retain its position on the apron. The forward pulling force exerted on the slice, however tends to stretch the elastic apron slightly on the intake side of the knives in the direction of its traveling movement, with the result that there is a tendency to elongate slightly the slice of meat in the direction of its traveling movement. The meat is slit in its slightly elongated state, but as soon as the slice of meat moves past the knives, the elasticity of the belt causes it to recover and thereby tends to contract the meat slightly in the direction of its length. The slice of meat, therefore, will be delivered in a compact form as distinguished from a slightly elongated or attenuated form. The use of rubber for the apron has a further advantage that the apron will be kept taut in all of its adjustments, for when the upper run of the apron is adjusted upwardly toward the knives, the apron will simply stretch slightly, and when it is adjusted downwardly, the elasticity of the apron will still keep it taut.

140 indicates an apron stripper situated at the delivery end of the apron and operating to strip the slice of meat therefrom in case said slice tends to stick to the apron.

The construction shown in Figs. 1 to 7 is provided with means for cleaning the apron 20 so that it will always present a clean surface to receive a slice of meat 19. This cleaning device may conveniently be in the form of a brush 141 which acts on the under run of the apron.

The brush herein illustrated is a rotary brush which is carried by a shaft 142 that is mounted in brackets 143 that are secured to and depend from the side bars 23, 24.

Any suitable means for rotating the brush may be employed and as indicating one convenient construction I have provided for driving the brush from a sprocket wheel 144 which is rigid with the sprocket wheel 34, said sprocket wheel 144 being connected by a sprocket chain 145 to a sprocket wheel 146 fast on the brush shaft 142. With this construction the meat-receiving face of the apron will be progressively cleaned so that it will always present a clean surface on which to receive a slice of meat.

In Figs. 11 and 12 I have illustrated a different embodiment of the invention wherein the adjustment for the depth of the slits is provided for by adjusting the knives toward and from the apron. In this embodiment of the invention the bearings 3a in which the knife shaft 2a is journaled are mounted for turning movement in the uprights 7, 7a, of the frame, and the knife shaft 2a is journaled eccentrically in these bearings, as shown in Fig. 14. Instead of being rigidly connected to the frame, the bearings 3a are free to turn in the openings 10 and the turning of the bearings in the uprights 7 and 7a of the frame will cause the knife shaft to be raised or lowered. Each bearing is shown as having an arm 71 rigid therewith, these arms extending radially from the bearing and lying just outside the upright members 7, 7a, of the frame. The arms are connected by a cross member 72 which is provided with a handle 73 by which it may be manipulated. This cross member 72 is shown as secured to the ends of the arms 71 by means of attaching screws 74. The handle 73 thus provides means by which the bearings 3a can be turned for raising and lowering the knives relative to the apron 20, and by swinging the handle 73 toward the right or the left, Fig. 11, the desired adjustment of the knives will be made.

There is provided means for locking the cross member 72 to the cover plate 13 and for this purpose said cross member is provided with a spring-pressed locking pin 75 which is adapted to enter any one of a plurality of apertures 76 with which the cover plate 13 is provided. The locking pin 75 is backed by a spring 77 and is provided with a knurled head 78 by which it may be lifted against the spring to disengage it from the aperture 76. In this embodiment, the supporting roll for the apron, which is situated directly underneath the knives, is in the form of a sleeve 79 which is loosely mounted on a rod 80 that extends from one side rail 23 to the other side rail 24.

Figs. 11 and 12 also illustrate a slightly different form of stripper which is somewhat in the form of a grid. This stripper which is indicated generally at 37a, comprises separate stripper fingers 81 which are secured at one end to the head 38a, the other ends of the fingers 81 being connected together by a connecting strip 82. This form of stripper does not have individually flexible stripper fingers, as in the form shown in Figs. 1 and 7. The head 38a of the stripper assembly is removably mounted on a cross bar 39a which is pivotally mounted, as in Figs. 1 and 7, one end of this cross bar being pivotally mounted in the upright 7 and the other end being pivotally mounted in the bracket arm 40. The yielding movement of the stripper which is necessary to accommodate the slices of different thickness is provided for by means of a U-shaped spring 83, one arm 84 of which is secured to the supporting bar 39a and the other arm 85 of which is fastened at its end to the inside of the upright 7. This spring tends to turn the stripper assembly counterclockwise in Fig. 11, thereby holding the stripper yieldingly against the slice of meat. The means for operating the apron in Fig. 11 is the same as that shown in Fig. 7.

In Fig. 15 I have shown still a different embodiment of the invention which includes rotary knives acting against the upper face of the slice of meat as in Figs. 1 to 11, and also includes rotary means situated beneath the knives and acting against the underface of the slice of meat and cooperating with said knives to perform the meat-slitting operation. Such rotary means as shown in Fig. 15 has a second set of rotary knives 86 which are mounted on a shaft 87 that is suitably journaled in the frame. In this embodiment of the invention, there are two sets of knives, one operating on the upper face of the slice of meat and the other operating on the lower face of said slice. The knives operating on the upper face of the meat are indicated at 1b in Fig. 15 and these knives are similar to the knives 1 shown in Figs. 1 to 11, said knives being mounted for vertical adjustment in the same way as are the knives 1 in Figs. 1 to 11.

The lower shaft 87 which carries the knives 86 that act on the under side of the slice is driven from the shaft 2b carrying the upper set of knives 1b by means of a sprocket chain 32b, which passes around a sprocket wheel 33b by which the apron 20b is operated, as will be presently described, and also around an idler roll 34b carried by the frame, the chain passing underneath the sprocket wheel 31b fast on the shaft 2b carrying the upper knives 1b. The shaft 87 carrying the lower knives 86 has a sprocket wheel 88 fast thereon under which the lower run of the sprocket chain 32b passes (see Fig. 16). With this driving means, the sprocket chain will positively rotate the lower knives 86 in a direction opposite to that in which the upper knives 1b are rotated. The apron by which the meat is fed to and past the knives is indicated at 20b and it is arranged so as to pass under the lower set of knives 86. This apron passes around a direction roll 21b at one end of the side rails 23, 24, and around a driving roll 22b at the other end of said rails, which driving roll is rigid with the sprocket wheel 33b. The apron also passes around direction rolls 89, 90, 91 and 92, which carry the upper run of the apron beneath the lower knives 86. 93 is a direction roll for the lower run of the apron under which said apron passes and which keeps it properly spaced from the portion of the upper run which passes around the direction pulleys 90 and 91. In this embodiment, the side rails 23 and 24 are secured to upstanding arms 95 rising from the portion 28b of the frame 4b, said arms having sufficient vertical dimension to provide for the installation of the lower set of knives 86.

96 indicates a grid which extends across from one side rail 23 to the other side rail 24 and which is provided with slots through which the lower knives 86 extend. This grid provides a support for the slice of meat while passing between the upper and lower knives.

In Figs. 15a and 15b I have illustrated an embodiment of the invention somewhat similar to that shown in Fig. 15, which has the upper set of knives 1b and the lower set of knives 86, but in which the apron 20b is divided longitudinally and the narrow strips or sections indicated at 20s, in Fig. 15b, said narrow strips or sections being of a width to pass between the knives 86 of the lower set. In this embodiment, the upper run of the apron 20b passes over the grid 96, and the knives 86 of the lower set project through the spaces between adjacent apron sections 20s.

In Fig. 17 I have illustrated still another embodiment of the invention which has the upper and lower slitting knives 1c and 86c, as in Fig. 15, but in which the meat-feeding apron is made in two sections, one located on the input side of the machine and the other on the discharge side. The two sections of the feed apron are indicated at 20c and 20d. The apron section 20c passes around two rollers 21c and 97, and the other apron section 20d passes around two rollers 22c and 98. The rollers 97 and 98 are mounted for free rotation in the side rails 23 and 24. In this embodiment of the invention, the apron section 20c feeds the meat to the knives and to the supporting grid 96c while the apron section 20d receives the slit slices and discharges them from the machine. In this embodiment, both rollers 21c and 22c are driven, each roller driving its section of the apron. To provide for this, the roller 21c has a sprocket wheel rigid therewith as well as the roller 22c, the sprocket wheel on the roller 22c being indicated at 33c, and that rigid with the roller 21c being indicated at 100. The sprocket chain 32c passes around both sprocket wheels 33c and 100 and under the sprocket wheel 31c that is rigid with the knife shaft as well as over the idler sprocket wheel 34c. The sprocket chain 32c also passes under and in operative engagement with a sprocket wheel fast on the shaft 87c thereby to rotate knives 86c.

The knives on the upper and lower shafts in Figs. 15 and 17 may be set so as to stand opposite each other or so as to have a staggered relation, as desired.

It is to be understood that the device shown in Fig. 15 will embody a stripper similar to that shown in either Figs. 7 or 11. The stripper is omitted from Fig. 15 in order not to confuse the drawing.

In Fig. 18 I have shown an embodiment of the invention similar to that shown in Fig. 15 except that the rotary means that acts against the under face of the slice is in the form of a grooved roller instead of the lower set of knives 86 of Fig. 15. This grooved roller is indicated at 101, and it is provided on its periphery with grooves 102 adapted to receive the knives 1d. This roller is suitably mounted in the bearings carried by the side rails 23, 24, and is operated by the sprocket chain 32b in a manner similar to that in which the shaft 87 in Fig. 15 is operated, that is, the roll 101 has rigid therewith a sprocket wheel under which the lower run of the chain 32b extends, said chain having the same arrangement in Fig. 18 as it has in Fig. 15. With this embodiment of the invention, the knives will cut clear through the slice of steak, thereby cutting it into separate strips. The apron 20b for feeding the slice of meat through the machine shown in Fig. 18 is similar to that shown in Fig. 15.

In Fig. 20 I have shown an embodiment of the invention adapted to knit together two or more slices of meat, such as the slices indicated at 19a and 19b. This is accomplished by the use of toothed members 103 in place of slitting knives. The apron for feeding the superposed meat slices 19a, 19b, through the machine is indicated at 20e and is similar to that shown in Fig. 7, except that its traveling movement is at the same speed as the peripheral speed of the toothed members 103. As the superposed slices 19a, 19b are carried underneath the toothed members, the teeth thereof puncture the two slices and tend to force portions of the upper slice into the lower slice, tying the two slices together. This operation of puncturing the slices and tying them together serves the two-fold purpose of tendering the meat and uniting the slices so that they can be broiled and then eaten as a single slice.

The means for driving the apron 20e is somewhat similar to that shown in Figs. 1 and 7, except that the relative sizes of the feed roll and sprocket wheels are such as to give the apron a speed of movement equal to the peripheral speed of the toothed members 103. In this embodiment the apron 20e is carried by two rolls 21e and 104, both rolls being mounted in the side rails 23, 24. The roll 104 is a drive roll and has rigid therewith a sprocket wheel 33e which is actuated by a sprocket chain 32e that is driven from a sprocket wheel 31e fast on the shaft 2e which supports the toothed members 103. 34e is the idler sprocket wheel around which the sprocket chain passes.

The drive roll 104 for the apron 20e is shown as being as much larger than its sprocket wheel 33e as the toothed disks 103 are than the driving sprocket 31e, and the two sprocket wheels 33e and 31e are of substantially the same size. With this arrangement the feed apron 20e will be fed forward at the same speed as the peripheral speed of the toothed members.

Figure 22:
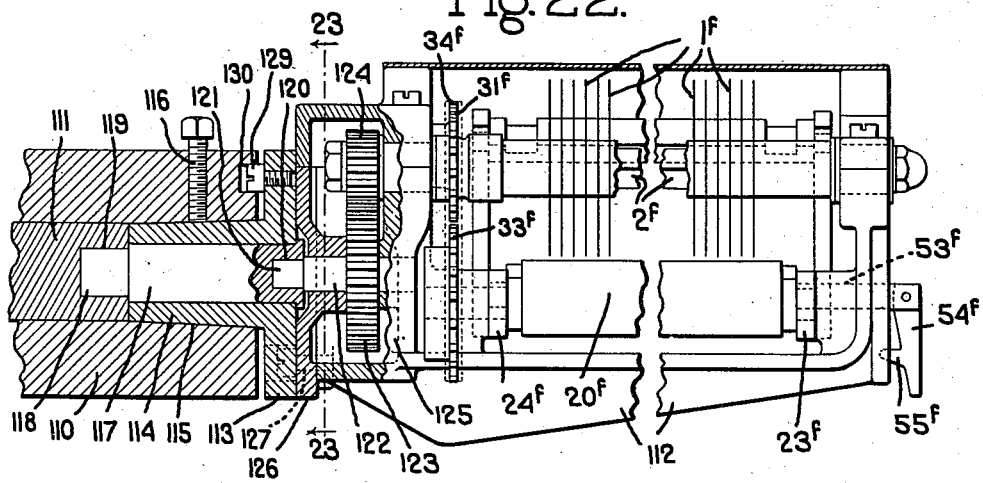
Fig. 22 is a section on the line 22—22, Fig. 21.
Figure 23:
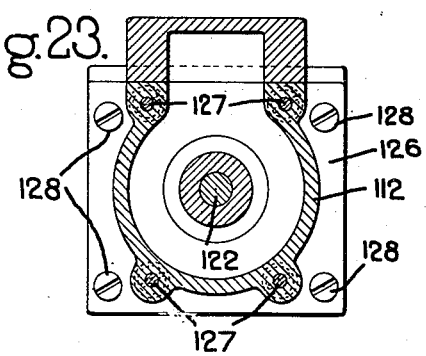
Fig. 23 is a section on the line 23—23, Fig. 22.

In Figs. 21 to 23 I have illustrated another embodiment of the invention in which the meat slitting element is built into a unit which is adapted to be detachably applied to a power kitchen implement such as a meat grinder or meat chopper. Such machines are frequently supplied with different units which can be selectively secured thereto and operated thereby, and the device shown in Figs. 21 and 23 is adapted to be operated in this way.

In Fig. 22 110 indicates a part of the power driven kitchen implement to which the accessory unit is attached, and 111 indicates a power shaft journaled in the bearing or part 110, said power shaft being driven from the motor by which the machine is operated.

The meat slitting accessory unit embodying my invention comprises a suitable frame 112 in which is rotatably mounted a knife shaft 2f carrying a plurality of rotary disk knives 1f. The meat to be slit is carried past the knives on an apron 20f which passes around two rolls 21f and 22f that are mounted in two side rails 23f, 24f that are secured to the frame 112 in some appropriate way. The frame 112 with the knives and apron mounted thereon is adapted to be detachably secured to the part 110 and in such a way that the knives and apron may be driven from the shaft 111. For this purpose I have provided an adaptor or connector 113 which is detachably secured to the frame 112 and is provided with a hub 114 adapted to be received in the recess 115 formed in the end of the part 110, this adaptor being held in the recess by means of a set screw 116.

The adaptor 113 has a shaft section 117 journaled therein which is provided at one end with a squared portion 118 adapted to be received in a correspondingly shaped recess 119 in the end of the power shaft 111. The other end of the shaft section 117 is provided with a flat sided recess 120 adapted to receive a corespondingly shaped end 121 of a shaft 122 which is journaled in the frame and on which is rigid a gear 123. This gear 123 meshes with a gear 124 fast on the knife shaft 2f so that when the meat slitting attachment is secured to the part 110, the knife shaft will be driven from the power shaft 111. The apron 20f is actuated from the knife shaft in the same manner as the apron 20 of Figs. 1 to 7 is actuated from the knife shaft 2. The knife shaft 2f has a sprocket wheel 31f fast thereon engaging a sprocket chain 32f that passes around a sprocket wheel 33f rigid with the roll 22f. The sprocket chain also passes around an idler 34f which is carried by the frame. The sprocket chain 32f passes under the sprocket wheel 31f so that the clockwise rotation of the knife shaft will operate through the sprocket chain 32f to give the upper run of the apron a forward feeding movement toward the left.

The apron 20f is preferably made of elastic material such as rubber and an adjustable support is provided for the apron directly beneath the knives so that the portion of the apron on which the meat is supported while it is being slit will be prevented from sagging. This adjustable support is similar to that shown in Fig. 7, it being a shaft 53f journaled in the side rails and having an eccentric portion and also having a handle 54f by which it may be turned to make the adjustment. This handle is shown as having a nose 55f thereby to lock the shaft from turning movement.

The frame 112 is made with the gear casing portion 125 which encloses its gears 123, 124, and this gear casing portion has a removable head or end 126 which head is secured to the frame by suitable screws 127. The frame 112 is detachably secured to the adaptor 113 by means of attaching screws 128 which are screwed into the adaptor from the right hand face of the head 126.

129 indicates a positioning projection in the form of a screw with a large head which is carried by the adaptor and which is adapted to be received in a recess 130 formed in the part 110 thereby to prevent the adaptor from turning. The stripper for holding the meat against the apron is omitted from Figs. 21 and 22.

Referring again to Figs. 1 to 4, I will preferably mount the motor 6 on an adjustable support so as to provide for maintaining the driving belt 41 at the proper tension. The motor is shown as carried on a platform 131 which is pivoted to the base portion 5 of the frame at 132. The free end of the platform is received between two projections 133 extending from an arm 134 that is adjustably secured to the base portion 5 of the frame. This arm 134 is shown as having a slot 135 therein to receive a clamping screw 136 which extends through the base portion 5 of the frame, said screw having screw-threaded engagement with the clamping nut 137 by which the arm 134 is clamped to the frame.

When the clamping screw is loosened, then the arm 134 can be raised or lowered, and when it is in its adjusted position, the clamping screw is tightened.

The projections 133 are preferably encased in rubber 138 so that the free edge of the platform is held between two rubber covered projections. There is thus provided a metal to rubber contact and the rubber takes up vibration.

If desired, the knife shaft may be extended at one end, as shown at 170 (Fig. 12) to receive a grinding wheel or polishing wheel, or any other implement. Such implement may be attached to the shaft extension 170 in any appropriate way, one convenient way being to provide said shaft extension with screw threads to receive the accessory to be attached thereto.

Instead of placing the slice of meat directly on the apron, as shown in Fig. 1, I may, if desired, place the meat on a plate 175 which is placed loosely on the apron but which is not attached thereto, as shown in Fig. 7.

It will be understood that a brush for cleaning the apron may be used in the devices shown in Figs. 8, 11, 15, 15a, 17, 18, 20, and 21, said brush being omitted from these figures in order not to confuse the drawings.

It will also be understood that some form of stripper similar to that shown in Figs. 7 and 11 will be used in connection with the embodiments of the invention illustrated in Figs. 15, 15a, 17, 18, 20, and 21, the stripper being omitted from these figures in order not to confuse the drawings.

I claim:

1. A meat-slitting machine comprising an upper set of rotary knives, a lower set of rotary knives, means to rotate the knives, an endless meat-supporting apron to feed a slice of meat between said sets of knives and to deliver the slit slice from the knives, and means for guiding the upper run of the apron beneath the knives of the lower set.

2. A meat slitting machine comprising a set of rotary knives, means to rotate the knives, an endless apron for feeding a slice of meat to said knives and for delivering the slit meat from the knives, rotary means situated beneath the knives and cooperating therewith to cut slits in the meat, means to rotate said rotary means, and means for guiding the upper run of the apron beneath the rotary means.

3. A meat-slitting machine comprising a set of rotary meat-treating members, a shaft on which said members are mounted, means to give the shaft a continuous rotative movement, an endless meat-supporting apron for feeding a slice of meat past said meat-treating members, guide rolls around which said apron passes, a sprocket wheel rigid with one of said guide rolls, and means separate from the shaft-rotating means and actuated by said shaft to rotate said sprocket wheel with a continuous feeding movement, said means comprising an idler sprocket wheel situated on the opposite side of said shaft from the first-named sprocket wheel, a sprocket chain passing around said sprocket wheels and a driving sprocket wheel fast on said shaft and which engages and has operative driving connection with the upper side of the upper run of said sprocket chain between the idler sprocket wheel and said first-named sprocket wheel.

4. A meat-slitting machine comprising a frame, an upper and a lower knife shaft journaled therein, a series of rotary knives on each knife shaft, a travelling meat-supporting apron which is made in one piece from one edge to the other and has a width at least as great as the distance between the end knives on the upper shaft and which is provided with an input portion by which a slice of meat is fed between the sets of knives and a delivery portion which delivers the slit slice from the knives, means to rotate both knife shafts, and means actuated by one of the knife shafts for advancing the feed apron.

5. A meat-slitting machine comprising a frame, an upper and a lower knife shaft rotatably mounted therein, a series of rotary knives on each shaft, an endless meat-supporting apron which is made in one piece from one edge to the other and has a width at least as great as the distance between the end knives of the upper shaft and which is provided with an input portion by which a slice of meat is fed between the two sets of knives and a delivery portion which delivers the slit slice from the knives, means to rotate both shafts, and means actuated by the upper shaft to operate the endless meat-supporting apron.

JOSEPH P. SPANG.